United States Patent
Sung et al.

(10) Patent No.: US 7,966,031 B2
(45) Date of Patent: Jun. 21, 2011

(54) METHOD AND SYSTEM FOR DIVIDING SINGLE POC GROUP SESSION

(75) Inventors: Sang-Kyung Sung, Seoul (KR); Joon-Goo Park, Yongin-si (KR); Kyung-Tak Lee, Yongin-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 881 days.

(21) Appl. No.: 11/667,527

(22) PCT Filed: Nov. 11, 2005

(86) PCT No.: PCT/KR2005/003839
§ 371 (c)(1), (2), (4) Date: Nov. 19, 2007

(87) PCT Pub. No.: WO2006/052109
PCT Pub. Date: May 18, 2006

(65) Prior Publication Data
US 2008/0305821 A1    Dec. 11, 2008

(30) Foreign Application Priority Data

Nov. 11, 2004    (KR) .................. 10-2004-0092121

(51) Int. Cl.
*H04B 1/38*    (2006.01)
*H04B 7/00*    (2006.01)

(52) U.S. Cl. ........ 455/519; 455/518; 455/417; 455/90.2

(58) Field of Classification Search .................. 455/515, 455/518, 519, 416, 517, 516, 415, 417, 520, 455/521, 452.1, 92.2; 370/260
See application file for complete search history.

(56) References Cited

U.S. PATENT DOCUMENTS

| | | | |
|---|---|---|---|
| 6,404,873 B1 | 6/2002 | Beyda et al. | |
| 7,283,489 B2 * | 10/2007 | Palaez et al. | 370/277 |
| 2004/0120474 A1 | 6/2004 | Lopponen et al. | |
| 2004/0192364 A1 | 9/2004 | Ranalli et al. | |
| 2005/0124365 A1 * | 6/2005 | Balasuriya et al. | 455/518 |

FOREIGN PATENT DOCUMENTS

JP    10-164240    6/1998
JP    2002-359690    12/2002

* cited by examiner

*Primary Examiner* — John Lee
(74) *Attorney, Agent, or Firm* — The Farrell Law Firm, P.C.

(57) ABSTRACT

A method and system for dividing a signal push-to-talk-over-cellular (PoC) group session are provided. The method includes requesting, at a PoC client, session division to a participating PoC function (PF) of a PoC server that manages a PoC session to which the PoC client belongs; requesting, at the PF of the PoC server, the session division to a controlling PoC function (CF) of a PoC server; transmitting, at the CF of the PoC server, information necessary for a new PoC session to at least one PoC client that desires to participate in the new PoC session while requesting the session division; and connecting, at the PoC client which is to participate in the new PoC session, to a CF of a PoC server which manages the new PoC session through a CF of an existing PoC server to thereby participate in the new PoC session.

16 Claims, 9 Drawing Sheets

METHOD AND SYSTEM FOR DIVIDING SINGLE POC GROUP SESSION

TECHNICAL FIELD

The present invention relates to a method and system for dividing a PoC group session in which a new, independent PoC session is set up by dividing without terminating the PoC group session when some participants of the PoC group session desire to set up the new PoC session.

BACKGROUND ART

Significant developments in mobile communication technology and the extension of mobile communication networks have resulted in the development of a vast array of additional services and applications for use with a cellular phone. Concurrently, demand among cellular phone users for additional services such as a location service, a multimedia service and a push-to-talk (PTT) service is increasing. The PTT service supports various supplementary functions such as instant messenger, a status display and a group call and a voice call which are also provided by an existing radio or a trunked radio system (TRS).

Standardization of a push-to-talk-over-cellular (PoC) service that employs the PTT function in a mobile communication network is currently taking place. One unique feature of the PoC service is that a user can participate in a plurality of PoC sessions and so can switch from the PoC sessions to use a call service. This feature is a requirement that is specified in the open mobile alliance (OMA), which is a forum for specifying mobile communications services.

FIG. 1 is a schematic diagram of a conventional PoC service system. Referring to FIG. 1, a PoC client 10, which is a service requester installed in a mobile station, i.e., a PoC terminal, is connected to a SIP/IP core network 30 which supports session initiation protocol (SIP) and internet protocol (IP) multimedia functions via an access network 20.

The PoC client 10 resides in the PoC terminal to provide access to the PoC service. The main function of the PoC client 10 is to initiate a PoC session, participate in a PoC session that is currently proceeding and terminate a PoC session. The PoC client 10 makes and transfers a talk burst, supports an instant personal alert and performs authentication when accessing the PoC service. Hereinafter, unless otherwise stated, the PoC client 10 is assumed to be the same as a PTT service subscriber.

The SIP/IP-based core network 30 is connected to a PoC server 60, a group list management system (GLMS) 50 and a presence server 70 in order to support the PoC service.

The PoC server 60 has a controlling PoC function for maintaining a PoC session, or a participating PoC function for participating in a PoC session for a one-to-one PoC call or a one-to-two or more PoC call (or group PoC call).

Functional blocks of the PoC server 60 will be explained below with reference to FIG. 2.

FIG. 2 is a schematic diagram of a conventional PoC server.

A function of the PoC server is classified into a controlling PoC function (CF) for maintaining a PoC session and a participating PoC function (PF) for maintaining each PoC session, which will be explained below with reference to relevant tables.

TABLE 1

Controlling PoC Function (CF)

Provides centralized PoC session handling
Provides centralized Media distribution
Provides centralized Talk Burst Arbitration functionality including talker identification
Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As described in Table 1, the CF maintains a PoC session. The PoC server receives requests for the floor from PoC clients, arranges an order in which the clients are given the floor and gives the clients the floor in that order. The PoC server also distributes a talk burst from a specific PoC client to all PoC clients participating in a group PoC call, and provides information regarding the PoC clients participating in the group PoC call.

As described below in Table 2, the PF manages a PoC session between the CF and each PoC client. The PF relays the floor to the PoC client from the CF. The PF relays media between the CF and the PoC client, provides transcoding between different codecs and provides a filtering function for filtering one of two PoC sessions chosen by a user when there is simultaneous talking in two active PoC sessions.

TABLE 2

Table 2 Participating PoC Function (PF)

Provides PoC session handling
May provide the Media relay function between PoC Client and Controlling PoC server
May provide user media adaptation procedures
May provide the Talk Burst control message relay function between PoC Client and Controlling PoC server
Provides SIP session handling, such as SIP session origination, termination, etc, on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client The PoC service system comprises the GLMS 50, which provides a PoC group and a PoC group list, which are necessary for setting up a PoC group session, and a group management/administration unit 40 that manages the PoC groups and the list.

The PoC service system further comprises the presence server 70, which provides and maintains information as to whether or not there is an individual or a group that desires the PoC service, and a remote PoC network 80 which comprises, for example, a SIP/IP core network and a PoC server of another user to provide a connection with another user for a one-to-one PoC call or a one-to-many PoC call.

In the above PoC service system, a PoC user can input information about a group and group members to the GLMS 50 through his/her PoC terminal, and can receive information about PoC users whom he or she can call through an individual or group list transmitted from the GLMS 50. Alternatively, information about a group and group members in the GLMS 50 can be input, corrected and managed via a reliable communication network such as the Internet or Intranet.

The PoC user registers a PoC address of his/her PoC terminal in the SIP/IP core network in order to use the PoC service. Upon a request of the PoC user, the SIP/IP core network stores PoC user information. Thus, when another PoC user tries to request a group PoC call, the PoC user registers his/her information in the SIP/IP core network in advance and requests a PoC call to his/her SIP/IP core network using group identification information transmitted from the GLMS 50. The SIP/IP core network performs address determination and domain location determination using information of the call requesting PoC user, and then transfers a PoC call request to a home PoC server with which the call requesting PoC user is registered. The PoC server prepares for establishment of a PoC session, obtains each user's information from the GLMS 50 at the PoC call request, and then transfers a PoC call request signal to a corresponding SIP/IP core network. When a PoC call request is made to users within an Intradomain, the PoC server performs both the CF and the PF. The PoC server that manages a call-requested PoC user requests a PoC call to the PoC user using information it receives from the PoC user after the SIP/IP core network performs the location determination procedure.

FIG. 3 is a flowchart illustrating a conventional PoC session call set-up procedure.

A PoC client A transmits to a SIP/IP core network A an INVITE message containing information about an individual or a group to which it desires to talk. The SIP/IP core network A recognizes a parameter that represents the PoC service from information of the INVITE message sent from the PoC client A and transmits an INVITE request to a PoC server A that manages the PoC client A. A function of the PoC server A as a home PoC server is implemented depending on a PoC call type. For example, when it sets up a PoC session such as a one-to-one PoC call or an ad-hoc group PoC call, its home PoC server function is implemented to perform both the CF and PF and transmits the INVITE message to a PoC server B that manages a PoC client B. In the case of a pre-arranged group PoC call, a session management function cannot be implemented in the home PoC server since it participates in a previously arranged PoC session. Thus, the INVITE message is transmitted to the PoC server A which performs the CF. The SIP/IP core network serves as a passage for relaying the INVITE message and searching for an address of the PoC server A or B. When the INVITE message is transmitted to the PoC client B, the PoC client B transmits a response to the PoC client A such as alerting, ringing, a light or a beep. When the PoC client B accepts the PoC call, an OK response is transmitted to the PoC client A. As a result, a PoC call is set up. That is, the PoC call is finally established when the PoC client A takes the floor from the PoC server that performs the CF.

The PoC service described above provides a PoC call between two individuals or a group PoC call between more than two individuals, and also supports a multiple PoC session in which one PoC client participates in a plurality of group PoC calls using a PoC terminal. During the group PoC call, some members of one group may desire to divide a PoC group session. The PoC group session can be divided when there are too many members participating in one PoC group session to take the floor or some members of the group desire to perform a separate group PoC call.

In the conventional PoC service, the PoC user can participate in only one PoC group session or in a plurality of PoC sessions. When some members of the group desire to divide a new group PoC session from one PoC group session to perform a PoC call in the new PoC group session that includes specific members, the members terminate the existing PoC group session and then set up the new PoC group session.

FIG. 4 is a flowchart illustrating a method for dividing a PoC group session according to the conventional art.

In FIG. 4, a PoC session X is a group PoC session to be divided at some members' request, and a PoC client X and a PoC client Y perform a PoC group session procedure for receiving a talk burst from a PoC server X to take the floor. In order for the PoC client Y to divide the currently proceeding PoC group session, a session termination request "BYE Request" is transmitted to the CF that manages the currently proceeding PoC group session. As the session termination procedure, media parameters of the PoC session X that are set between a server and a client are released. After terminating the PoC session X, the PoC client Y transmits an INVITE request to set up a new PoC session. The PoC client Y transmits the INVITE request to a PoC server of a home network so that the PoC server can become a CF for managing the new PoC session. Other PoC users who have already terminated the existing PoC group session are then requested to set up the new PoC session to perform an independent talk burst control procedure.

One benefit of the PoC call is low cost. There may be a situation in which some members participating in a group PoC call desire to divide a group PoC session to open a new PoC session for a group PoC call in which only specified members participate. However, the conventional PoC service should undergo a procedure for terminating the currently proceeding PoC group session to divide the PoC group session. This can cause a problem wherein the PoC users have to wait during a termination operation. Furthermore, an initializing procedure, for example, for setting media parameters should be performed again when the group members are to be re-connected.

DISCLOSURE OF INVENTION

Technical Problem

It is an object of the present invention to provide a method for dividing a PoC group session in which a new PoC group session can be divided from an existing PoC group session without terminating the existing PoC group session when some participants of the existing PoC group session desire to divide the existing PoC group session into at least two sessions.

It is another object of the present invention to provide a method for dividing a PoC group session in which media parameter information necessary for connecting an existing PoC group session is not deleted but is implicitly maintained even after dividing a new PoC session from the existing PoC group session so that the existing PoC group session can be restored later.

Technical Solution

According to an embodiment of the present invention, there is provided a session division method in a PoC network having a currently proceeding session, that includes requesting, at a first PoC client, session division to a session management server, requesting, at the session management server, a second PoC client to participate in the session division in response to the session division request and producing a new session.

According to another embodiment of the present invention, there is provided a PoC system having a currently proceeding session, the system including a first PoC client requesting session division, a session management server responding to the session division request, a second PoC client being requested to participate in a new session from the session management server and the new session.

Advantageous Effects

As described above, when participants of the single PoC group session desire to divide the PoC group session into two or more PoC sessions, the PoC group session can be divided without termination.

As a result, a privacy problem between the new PoC session and the PoC session that manages an independent talk burst, and a floor problem resulting from an increment of the talk burst PoC group members and an increment of talk burst traffic, can be resolved.

When the PoC members desire to return to the existing PoC group session after a PoC call in the new PoC session, the existing PoC group session can be easily restored by requesting parameter setting change to the PoC server of the existing PoC group session from the CF of the new PoC session.

In particular, since the existing PoC group session is divided to make the new PoC session, signaling and resource consumption can be reduced, and the PoC user can use the new PoC session conveniently since the session division is rapidly completed.

DESCRIPTION OF DRAWINGS

The above and other objects, features and advantages of the present invention will be more clearly understood from the following detailed description, taken in conjunction with the accompanying drawings, in which.

MODE FOR INVENTION

The present invention will now be described more fully hereinafter with reference to the accompanying drawings, in which the preferred embodiments of the invention are shown. This invention may, however, be embodied in different forms and should not be construed as limited to the preferred embodiments set forth herein.

The present invention relates to a method and system for dividing a PoC group session with three or more participants into at least two sessions. The PoC group session can be divided into three sessions, but a preferred embodiment of the present invention will be explained focusing on dividing the PoC group session into two sessions.

Figure 1:
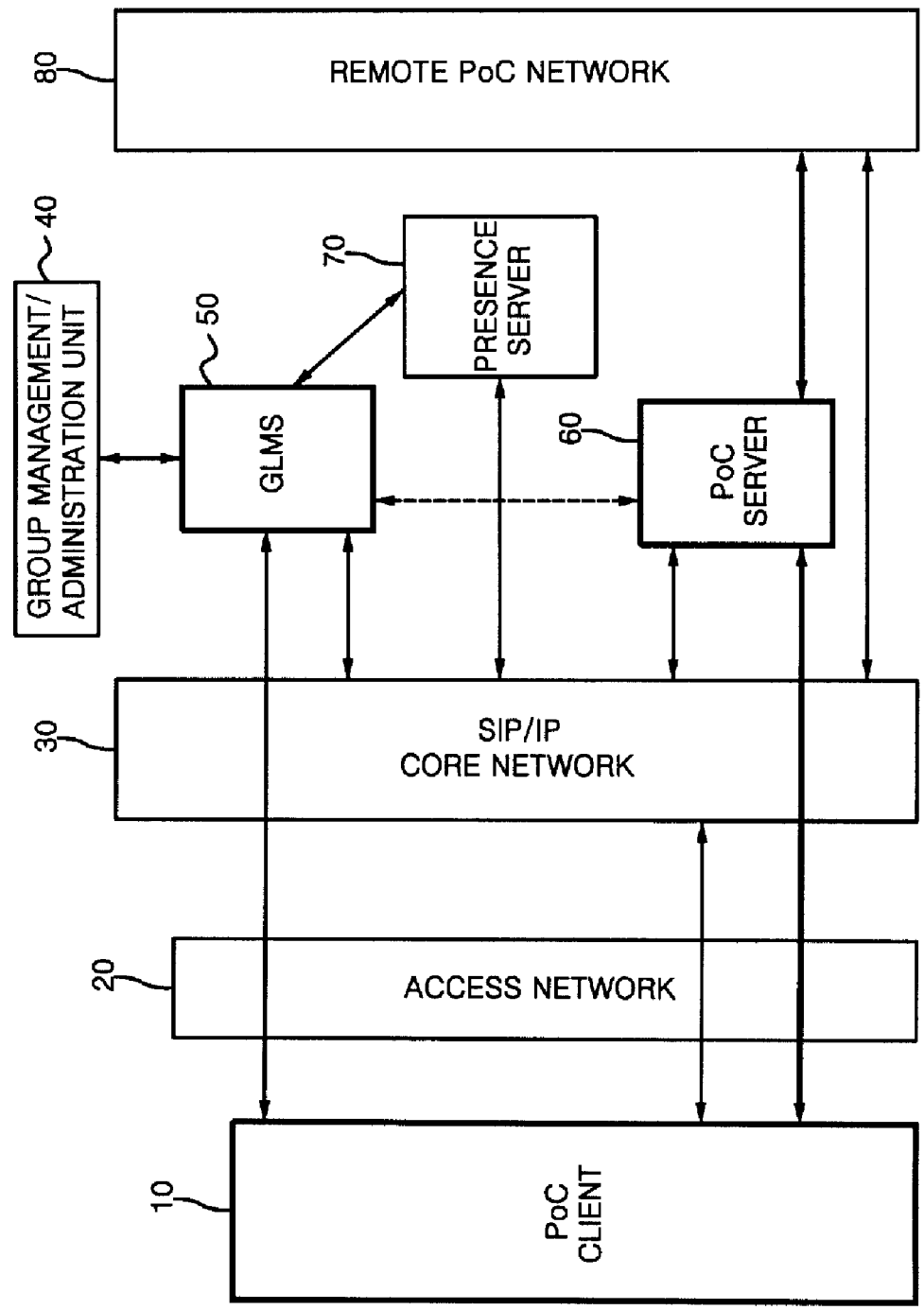
FIG. 1 is a schematic diagram of a conventional PoC service system.
Figure 2:
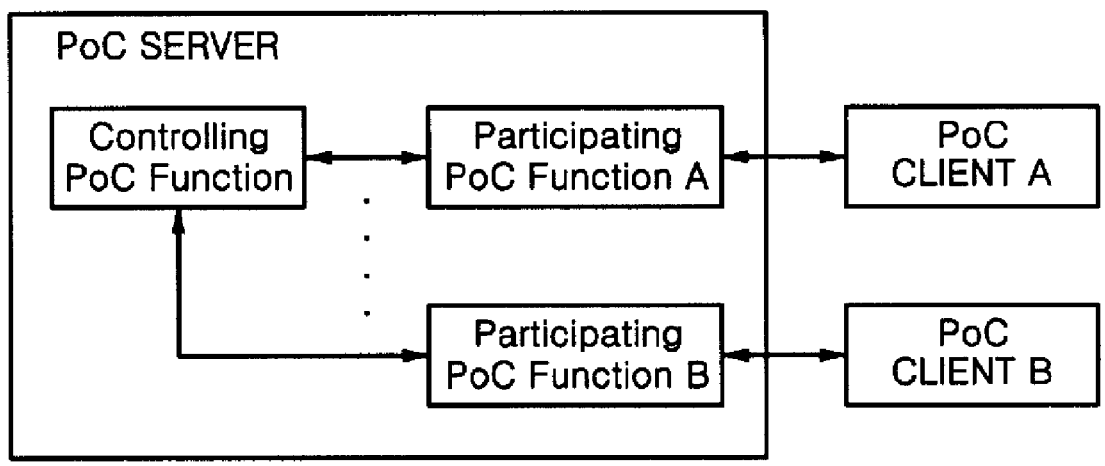
FIG. 2 is a schematic diagram of a conventional PoC server.
Figure 3:
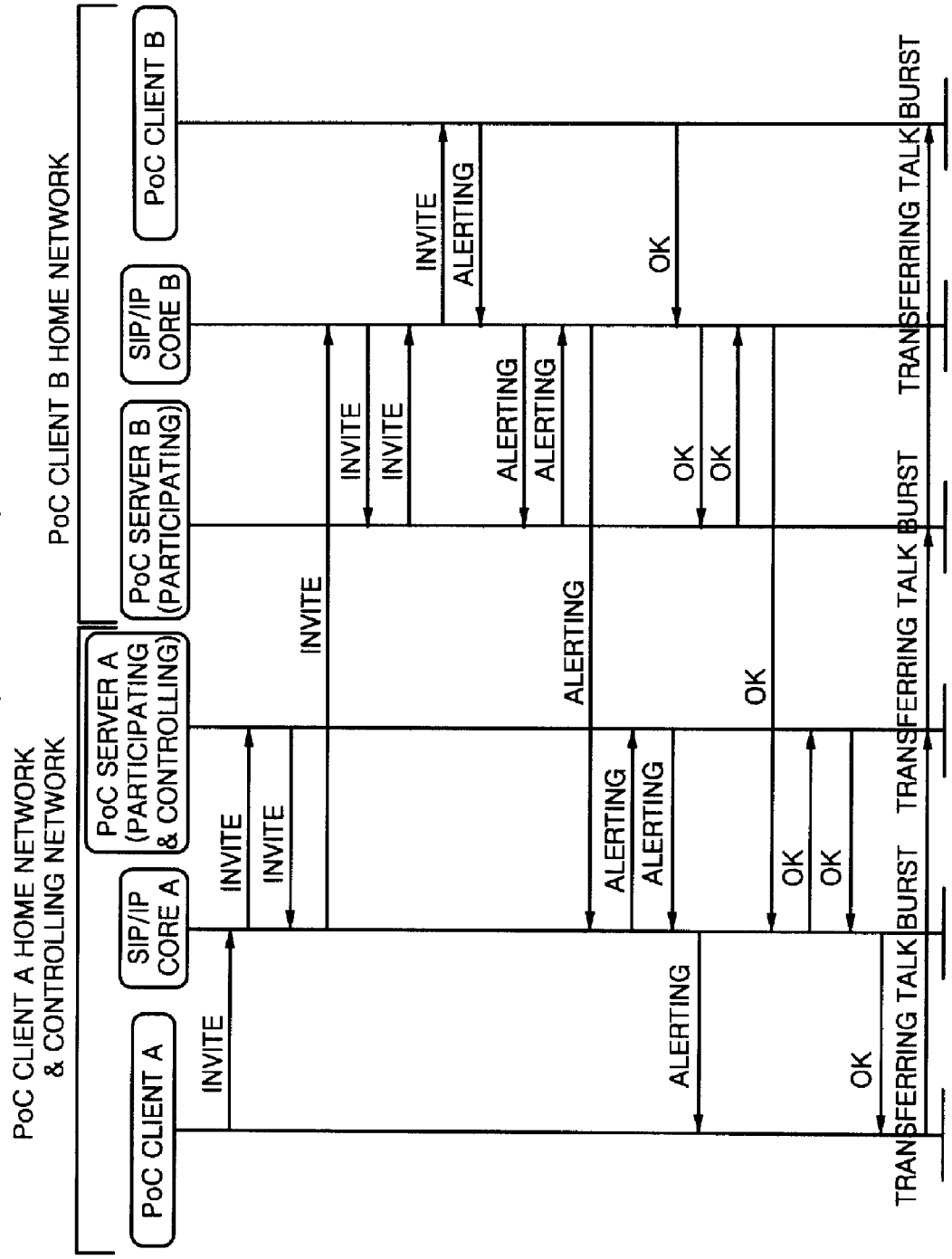
FIG. 3 is a flowchart illustrating a conventional PoC session set-up procedure.
Figure 4:
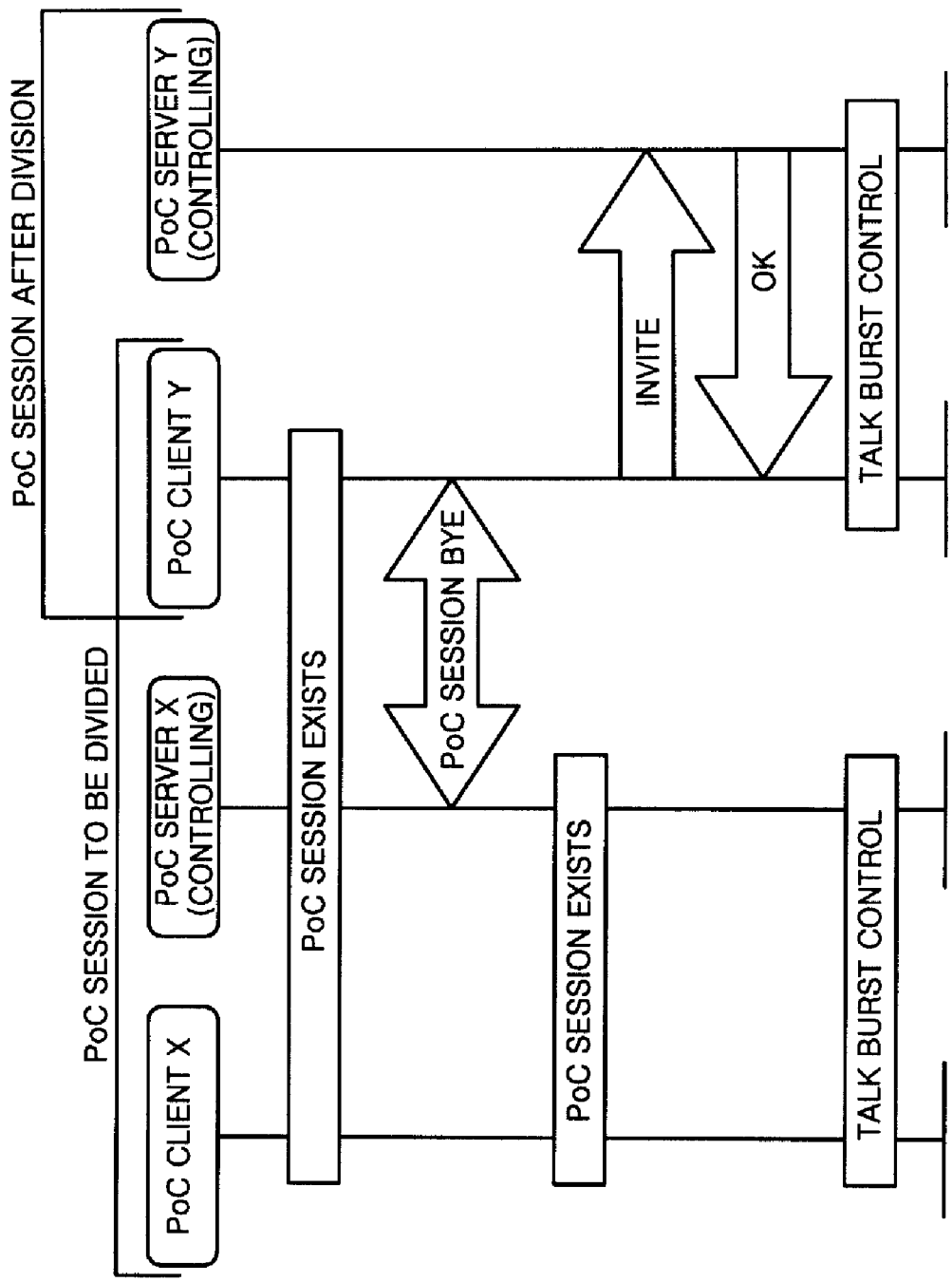
FIG. 4 is a flowchart illustrating a method for dividing a PoC group session according to the conventional art.
Figure 5:
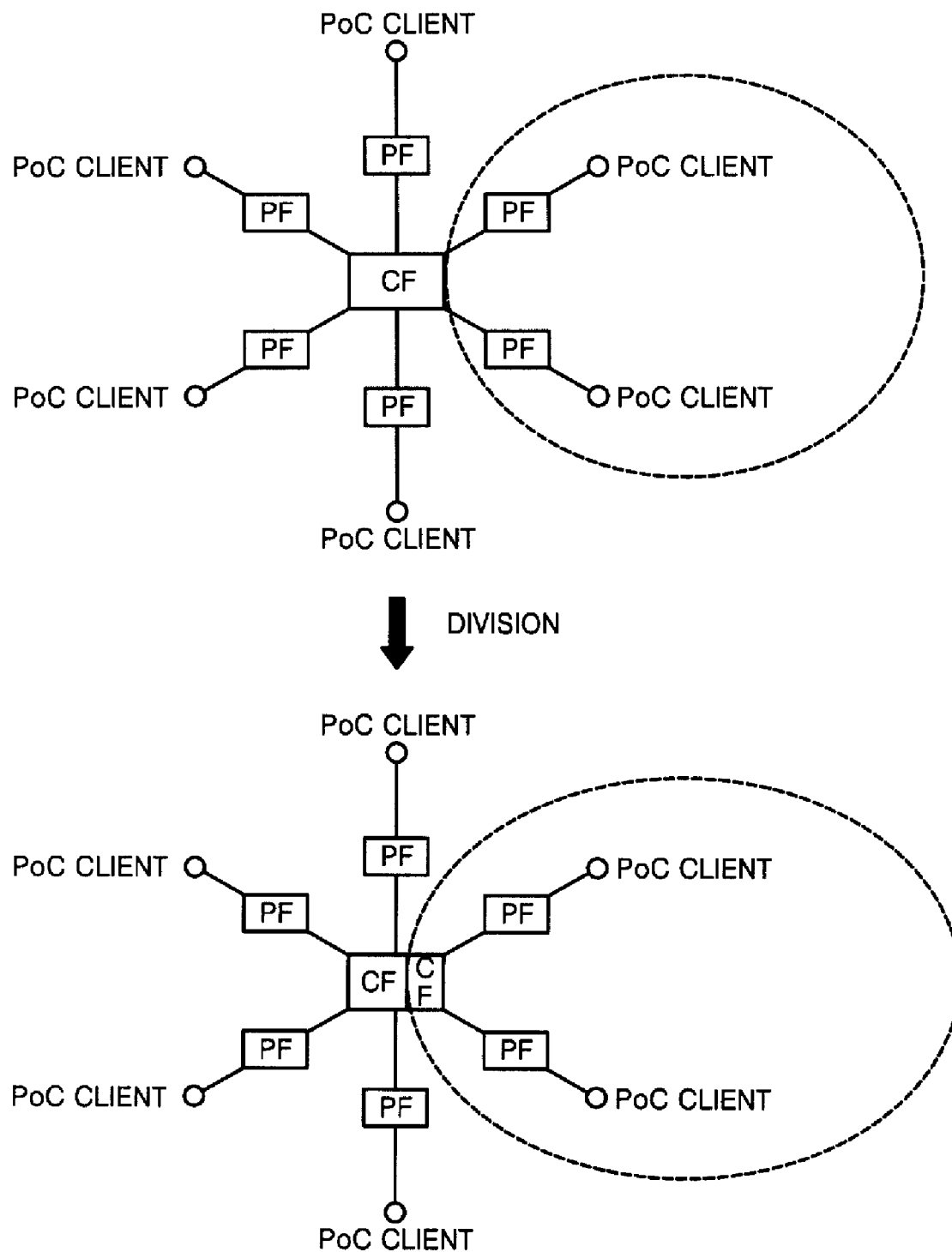
FIGS. 5 and 6 are schematic diagrams illustrating the status of a PoC group session before and after the PoC group session is divided.
Figure 6:
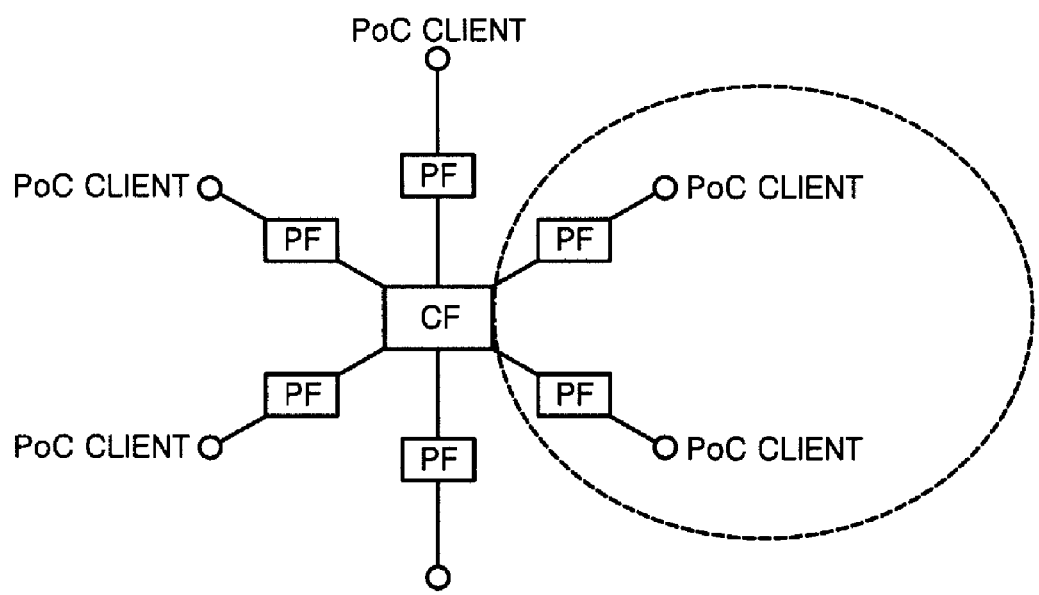
Figure 6:
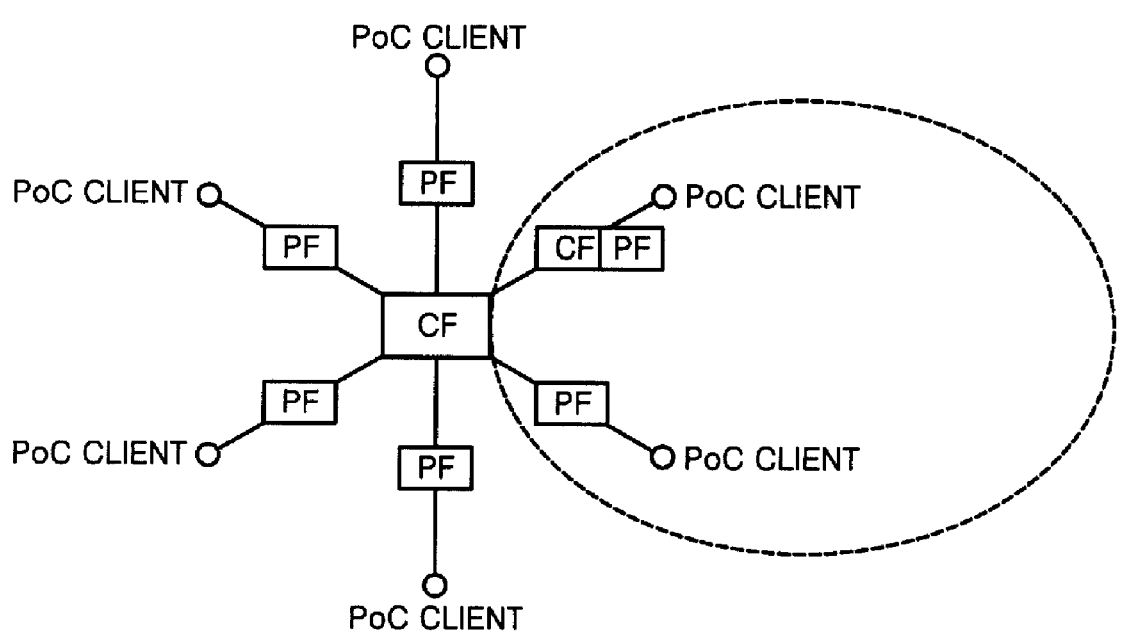

FIGS. 5 and 6 are schematic diagrams illustrating the status of a PoC group session before and after the PoC group session is divided.

Referring to FIGS. 5 and 6, PoC clients (group members) use the same CF before session division, but are connected to each other through each CF in each session by generations of CF that separately manage a new PoC session after session division.

Figure 7:
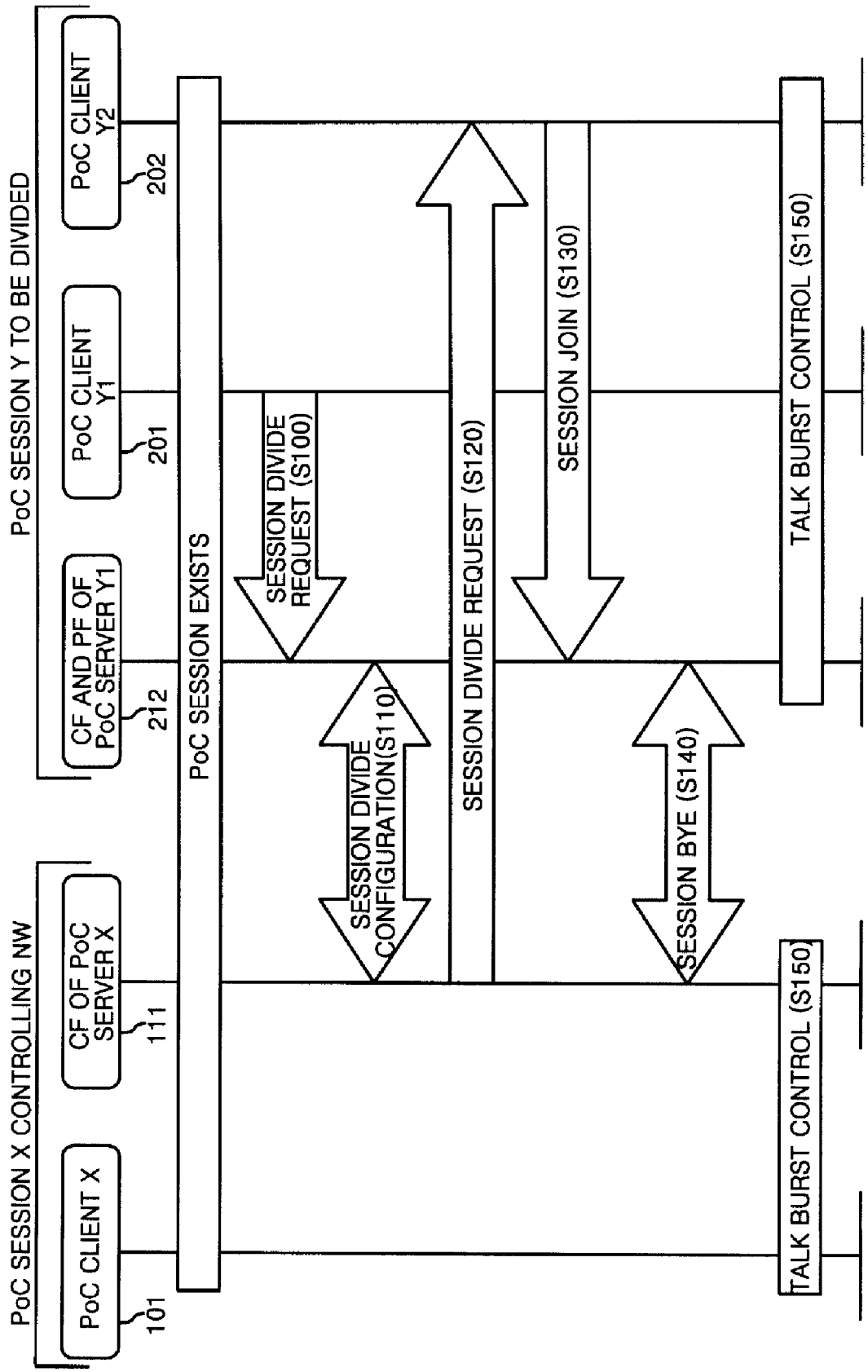
FIG. 7 is a schematic flowchart illustrating a procedure for dividing a PoC group session according to the present invention.

FIG. 7 is a schematic flowchart illustrating a procedure for dividing a PoC group session according to the present invention.

Referring to FIG. 7, a CF 111 of a PoC server X manages an existing PoC group session before division. A PoC client Y1 201 is a PoC user who requests session division. A PoC client Y2 202 is a PoC user who participates in the new PoC session. Not only an individual but also a plurality of PoC users can participate in the new PoC session by the same method as a procedure of the PoC client Y2 202.

The PoC client Y1 201 requests session division through a PF 212 within a PoC server Y1 (S100), and the PF 212 of the PoC server Y1 requests the session division to the PoC server X 111 that manages the existing PoC group session to perform necessary procedures (S110). At this time, the PF 212 of the PoC server Y1 requests to perform a PoC server function to manage the new PoC session. When the PoC server 111 approves the session division request and assigns a session management function to the PF 212 of the PoC server Y1, the PoC server X 111 is set to perform the PF function of the PoC server for PoC users of the PoC group session to be divided. If the CF 111 of the PoC server X approves the session division request through an authentication procedure for the session division request, the CF 111 of the PoC server X receives a PoC session division request indicator, a media parameter set by the PF of the PoC server Y1, an identifier to be assigned to the new PoC session and an identifier of members that will participate in a new PoC session (an individual or group identifier can be used, and an individual identifier is used in FIG. 7) and transmits the session division request to the corresponding PoC client Y2 (202) (S120). Then, the PoC client Y2 202 is connected to the CF 212 of the PoC server Y1 that manages a new PoC session to participate in the new PoC session (S130). The PoC users who participate in the new PoC session, such as the PoC client Y1 or Y2, have to perform a session termination procedure so that a talk burst is not sent to the existing PoC group session (S140). The session termination does not mean that the session is cut off. Rather, a talk burst transmitted between PoC sessions is not transmitted to the other PoC session that is divided. As a result, the new PoC session is provided with a mechanism for taking the floor by a talk burst control protocol of each PoC server CF (S150).

An alternative procedure for dividing the PoC group session can be performed according to function setting between the CF of the PoC server X and the PF of the PoC server Y1.

For example, the PoC server Y1 can perform the session division at the PoC client Y1's request by changing a function setting between PoC servers using only a PoC session division request indicator and an identifier of members that will participate in a new PoC session, even though the PoC server X does not transmit the session division request (i.e., INVITE message containing the divided session identifier) to the corresponding PoC client Y2. In such an instance, a PoC user who is asked to participate in the divided session should set a media parameter for the new PoC session when transmitting a talk burst.

Figure 8:
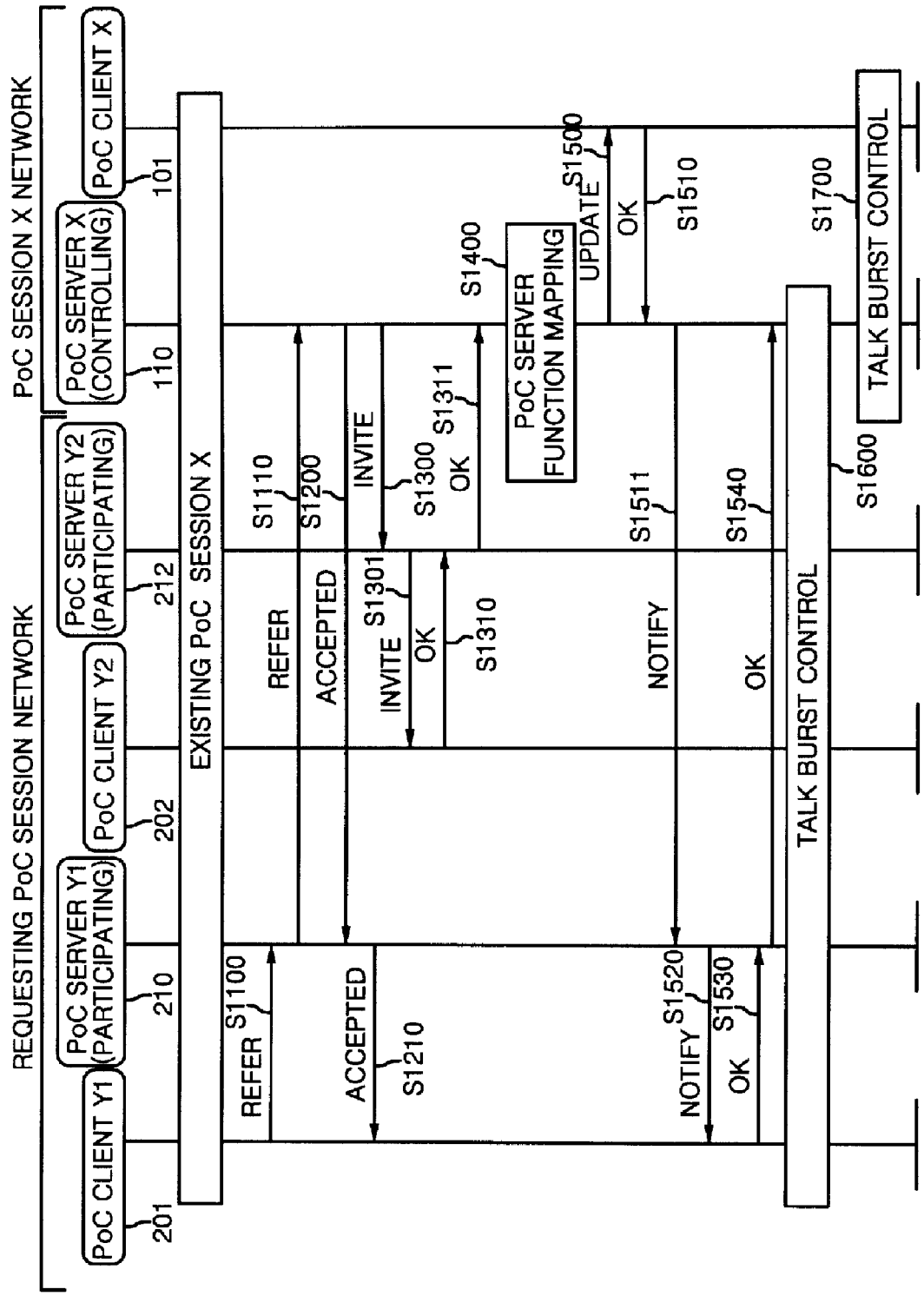
FIG. 8 is a flowchart illustrating a session division procedure performed by a session division request message from a PoC server at a PoC client's request according to an embodiment of the present invention.

FIG. 8 is a flowchart illustrating a session division procedure performed by a session division request message from a PoC server at a PoC client's request according to a first embodiment of the present invention.

In brief, FIG. 8 shows a PoC session division procedure performed by the PoC server Y1 210 using the CF of the PoC server X 111. In this procedure, the PoC client Y1 201 requests session division to the PoC server X 110, which is the management server of the existing PoC group session, through its PF using SIP, and then transmits a new INVITE request to the PoC client Y2 202 which joins the session division, so that the session is divided.

In order to request session division, the PoC client Y1 201 transmits a REFER request which contains its PoC address, an identifier of a existing PoC group session, an address of PoC clients who are to participate in the divided PoC session, a PoC session division indicator and a METHOD (i.e., INVITE) to be taken by a REFERred network component (S1100 and S1110), and receives an "Accepted" message from a PoC server as a response (S1200 and S1210). The REFER request is then transmitted to the PF of the PoC server Y1 210 after the SIP/IP core network connecting a PoC server performs an address determination (resolution) procedure.

The PF of the PoC server Y1 210 requests session division to the CF of the PoC server X 110 using PoC session division indicator information, transmits a media parameter determined by the PF of the PoC server Y1 210 and receives a provisional response message from the PoC server X 110.

The PoC server X 110 approves the session division according to a session policy for the session division request and transmits a new INVITE message to the address of the PoC client Y2 (S1300 and S1301).

The PoC client Y2 202 invited to participate in the divided session is aware of the fact that the PoC server Y1 210 becomes a new management server (i.e. CF) of the new PoC session and approves it through an OK message (S1310 and S1311).

After receiving the OK message in response to the INVITE message from the PoC user who initiates the session division, the CF of the PoC server X 110 performs a PF function for a corresponding address SIP URI (S1400) so that the PoC server Y1 210 can become a management server of a new PoC session.

PoC users of the existing PoC group session are notified of the session division so that a talk burst for the PoC clients Y1 and Y2 cannot be transmitted to the existing PoC group session (S1500). Then, the PoC client X transmits an OK response (S1510 and S1511) to notify the PoC client Y1 201 of the fact that the PoC server Y1 210 can serve as a CF for the divided session (S1510 and S1530).

The session-dividing method using the REFER method described above requires a REFER request header field which represents a session division indicator and request route (Record-Route) information of REFER/INVITE when the REFER request is transmitted. Also, when sending a new INVITE request to the PoC client Y2 from the CF (110) of the PoC server, a procedure for setting a media parameter for new media connection is performed.

Figure 9:
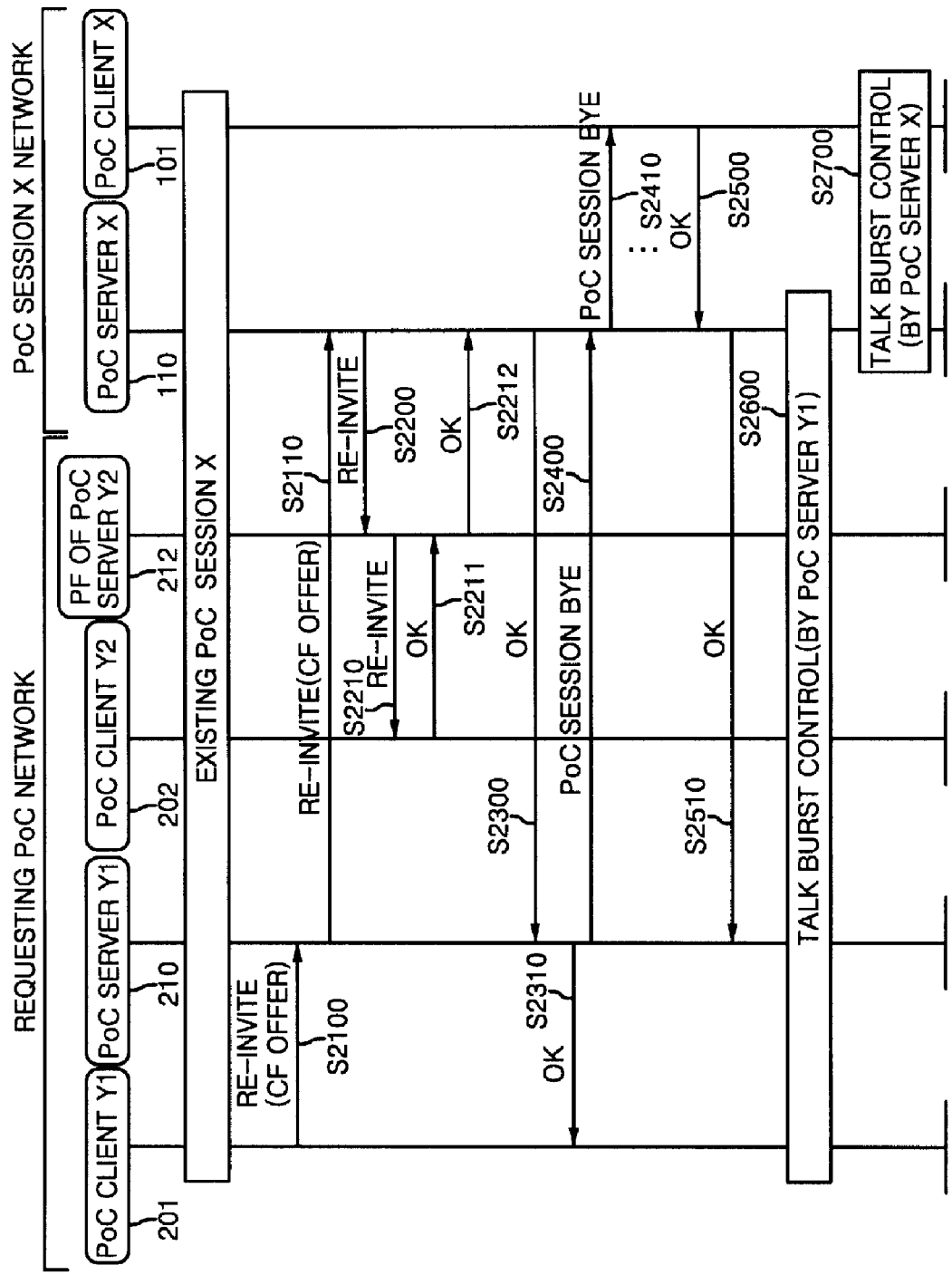
FIG. 9 is a flowchart illustrating a session division procedure performed by a session division request message from a PoC client according to a further embodiment of the present invention.

FIG. 9 shows a PoC session division procedure performed by the PoC server Y1 sending the request to the PF of the PoC server X. The PoC client Y1 201 requests session division to the PoC server X 110, which is a management server of the existing PoC group session, through the PF of the PoC server Y1 210 using SIP. The PoC server X 110 transmits an re-INVITE request to the PoC client Y2 202 that joins the session division by using connection of the existing PoC group session.

In order to request the session division, the PoC client Y1 201 transmits to the PoC server Y 210 a re-INVITE request which contains its PoC address, an identifier of a PoC group session, an address of a PoC client that desires to participate in the session division (group identifier in case of a group) and a PoC session division indicator (S2100).

The transmitted re-INVITE request is a request within the same session dialog to use the existing media connection, and the PoC server Y1 210 is aware of the fact that it will become a management server of the divided session, and so demands a CF function for the divided session from the PoC server X 110 to which the re-INVITE request is transmitted. The re-INVITE request contains a media parameter that is to be applied to the new divided PoC session using contents of a session description protocol (SDP). For example, the media parameter to be applied to the new PoC session contains an IP address and a port number, which are used by an RTP session and used to set a codec that will be used between media. The re-INVITE request is transmitted after the address determination (resolution) procedure is performed in the SIP/IP core network that connects the PoC client and the PoC server or connects the PoC servers.

The PoC server Y1 210 which has received the re-INVITE request requests the session division to the PoC server X 110 corresponding to the existing PoC group session using the PoC session division indicator at the PoC client's request (S2110), and transmits a media parameter determined by the PF of the PoC server Y1 210. At this time, it can receive a provisional response message to the re-INVITE request from the PoC server X 110.

Then, the PoC server X 110 sets itself to perform the PF function for the divided session identifier and the group members corresponding thereto and performs the subsequent session division procedure when the requested CF offer is approved according to the session policy for the session division request. Thus, the PoC server X transmits the re-INVITE message to the address of the PoC client Y2 with the re-INVITE request (S2200 and S2210).

The PoC client Y2 202 which is invited to join the divided session confirms that it is a session division member, is aware of the fact that the CF of the PoC server Y1 210 will become a management server of the divided session, and sends an approval by transmitting the OK message (S2211 and S2212).

After receiving the OK response to the re-INVITE request from the session division member, the PoC server X 110 informs of it to the PoC server Y1 210 and the PoC client Y1 201 which has requested the session division by transmitting an OK response to thereby notify that preparing for the session division is completed (S2300 and S2310).

In order to notify to the session division members that the PoC server X 110 performs the PF function other than the CF function with respect to the address (SIP URI of the session division member) corresponding to the divided session identifier and the PoC server Y1 210 becomes a management server of the divided session, the PoC server Y1 210 transmits a PoC session BYE message to the PoC group session members via a routing path (S2400 and S2410), and then it receives a confirmation message OK (S2500 and S2510).

The session dividing method using the re-INVITE method according to the present invention transmits the media parameter used in the session division and contained in the body of the SDP protocol as well as the PoC session division indicator and the CF off indicator when the re-INVITE request is transmitted. Thus, the request of the PoC client for the session division can be satisfied. The session dividing method using the re-INVITE method according to the present invention also requires the request route (Record-Route) of the REFER/INVITE to use the existing route of the PoC group session.

The present invention uses the SIP in order to perform the divided group PoC call while using the session connection of the existing group PoC call "as is". To this end, the CF function of the PoC server X is used in FIG. 8, whereas the CF for the divided session is changed by providing the CF offer when the re-INVITE request is transmitted from the PoC server in FIG. 9. A variety of modifications and variations may be made to the embodiments of the present invention shown in FIGS. 7 and 8 without departing from the spirit or scope of the present invention.

In a modification to an embodiment of the present invention, when the PoC server X receives the session division INVITE message at the PoC client's request, the session division can be determined by the CF of the PoC server X, by approval of all members that belong to a session division list or by approval of all members of the PoC group session, depending on a policy of the PoC group session. At this time, the PoC server X transmits the INVITE message after corresponding procedures to each instance are performed.

In a further modification to an embodiment of the present invention, a person who can request the PoC group session can be either a member of the PoC group session or a session operator. For example, the session operator can request the session division when the PoC server needs to request the session division according to its policy.

According to the present invention, when participants of the single PoC group session desire to divide the PoC group session into two or more PoC sessions, the original PoC group session can be divided without termination. Thus, the session division is performed using the functions of the PoC server from the previously established PoC group session and using the features of the already activated session "as is", thereby simplifying a set-up procedure of the new PoC session.

In the conventional art, each PoC user who desires to join the session division transmits the BYE message to terminate the PoC group session and then transmits the new INVITE message to perform a procedure for joining the session division procedure. However, the present invention does not require the session termination procedure, thereby reducing unnecessary signaling, resources and time consumption.

When the PoC members desire to return to the existing PoC group session after a call in the new PoC session, each PoC member can return to the existing PoC group session by transmitting the BYE message to the proxy PoC server from the PoC server that manages the new PoC session.

Further, the new PoC session can be set up by changing part of the media parameter of the existing PoC group session since the PoC server that manages the existing PoC group session is used. That is, the media parameter previously set between the PoC client and the PoC server can be used.

While the present invention has been described with reference to exemplary embodiments thereof, it will be understood by those skilled in the art that various modifications may be made therein without departing from the scope of the present invention.

The invention claimed is:

1. A method for dividing a single PoC group session, comprising:

requesting, at a PoC client, session division to a session division request server that manages a PoC session to which the PoC client belongs;

requesting, at the session division request server, the session division to a session management server that manages an existing PoC session;

transmitting, at the session management server, information necessary for a new PoC session to at least one PoC client that desires to participate in the new PoC session while requesting the session division; and connecting, at the PoC client which is to participate in the new PoC session, to a session division request server which manages the new PoC session through the session division request server to thereby participate in the new PoC session.

2. The method of claim 1, wherein the information necessary for the session division includes an address of the session division-requesting PoC client, a group identifier, a PoC address of the PoC client that desires to participate in the new PoC session, and a session division indicator.

3. The method of claim 1, wherein the session division-requesting PoC server requests that the session division requesting PoC server performs the new PoC session.

4. A system for dividing a single PoC group session, comprising:

a session division-requesting PoC server including at least one PoC client that requests session division in a single session, which receives the session division request from the session division-requesting PoC client, and requests session division to a session management server that manages a session to be divided; and the session management server which receives the session division request from the session division-requesting PoC server to assign a controlling PoC function (CF) that manages a new session at the session division-requesting server, and requests the session division while transmitting information necessary for the session division to PoC clients of the new session.

5. A session division method for dividing a PoC group session set up by dividing without terminating a previous PoC group session, comprising the steps of:

receiving a session division request, by a session division requesting server, from an inviting PoC client;

transmitting the session division request, by the session division requesting server, to a session management server;

receiving a message for assigning a session management function from the session management server when the session management server approves the session division request;

receiving a join request for participating in a new PoC session from an invited PoC client without terminating the previous PoC group session; and performing the previous PoC group session termination procedure for not transmitting a talk burst through the previous PoC group session.

6. The method of claim 5, wherein the session division request includes at least one of an address of the inviting PoC client, an address of the invited PoC client, an identifier of an existing PoC group session, an identifier to be assigned to the new session, a session division indicator and a media parameter.

7. The method of claim 5, wherein transmitting the session division request further comprises the session division requesting server requesting the session division to the session management server using PoC session division indicator information and transmitting a media parameter determined by the session division requesting server.

8. The method of claim 5, wherein the session division requesting server can become a management server of a new session, and further comprising the session management server performing a PF (Participating PoC Function) for the corresponding address.

9. The method of claim 5, wherein approving the session division request, by the session management server, according to a session policy and transmitting an INVITE message to the invited PoC client further comprises setting a media parameter for the new session being performed by the session management server.

10. The method of claim 9, wherein the media parameter for the new session includes an IP address and a port number, which are used by an RTP (Real Time Protocol) session and used to set a codec that will be used between media.

11. The method of claim 5, wherein the session division request is one of a REFER message or a re-INVITE message.

12. A push-to-talk-over-cellular (PoC) client method for dividing a PoC group session set up by dividing without terminating the PoC group session, comprising:
   requesting a session division to a session division request server;
   transmitting the session join message for participating in the divided session after receiving an INVITE message from a session management server; and
   receiving a notification of the session division from the session management server so that a talk burst of the inviting PoC client who participates in a new session can not be transmitted to a PoC client who do not participate in a new session.

13. A PoC client method of claim 12, further comprising the PoC client transmitting an OK response to notify the inviting PoC client that the session division request server can serve for the divided session.

14. A PoC client method of claim 13, wherein the session division request is one of a REFER message or a re-INVITE message.

15. A PoC client method of claim 13, wherein the session division request includes at least one of an address of the inviting PoC client, an address of a invited PoC client, an identifier of an existing PoC group session, an identifier to be assigned to the new session, a session division indicator and a media parameter.

16. A PoC client method of claim 15, wherein the media parameter for the new session includes an IP address and a port number, which are used by an RTP (Real Time Protocol) session and used to set a codec that will be used between media.

* * * * *